United States Patent
Kanayama

(10) Patent No.: US 9,735,620 B2
(45) Date of Patent: Aug. 15, 2017

(54) AC POWER SUPPLY SOURCE SWITCHING APPARATUS

(71) Applicant: DENSO CORPORATION, Kariya, Aichi-pref. (JP)

(72) Inventor: Mitsuhiro Kanayama, Takahama (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 448 days.

(21) Appl. No.: 14/557,860

(22) Filed: Dec. 2, 2014

(65) Prior Publication Data

US 2015/0155711 A1 Jun. 4, 2015

(30) Foreign Application Priority Data

Dec. 4, 2013 (JP) ................................ 2013-251180

(51) Int. Cl.
*H02J 1/00* (2006.01)
*H02J 3/00* (2006.01)
*H02J 9/06* (2006.01)

(52) U.S. Cl.
CPC ........... *H02J 9/062* (2013.01); *Y10T 307/696* (2015.04)

(58) Field of Classification Search
USPC ............................................... 307/64–66, 80
See application file for complete search history.

(56) References Cited

U.S. PATENT DOCUMENTS

| 6,154,376 A * | 11/2000 | Dan-Harry | H02M 3/28 363/131 |
| 6,465,911 B1 * | 10/2002 | Takeda | H02J 3/005 307/115 |
| 8,297,389 B2 * | 10/2012 | Takizawa | B60L 3/0046 180/65.265 |
| 8,854,838 B2 * | 10/2014 | Hara | H02J 9/005 363/16 |
| 9,024,585 B2 * | 5/2015 | Nakashima | H02J 7/0019 320/117 |
| 9,046,902 B2 * | 6/2015 | Chen | G05F 5/00 |
| 9,069,538 B2 * | 6/2015 | Sakai | G06F 1/263 |

(Continued)

FOREIGN PATENT DOCUMENTS

JP S63-176340 U 11/1988
JP H06-105483 A 4/1994

(Continued)

OTHER PUBLICATIONS

Office Action mailed Nov. 4, 2015 in the corresponding JP application No. 2013-251180 in Japanese with English translation.

*Primary Examiner* — Adam Houston
(74) *Attorney, Agent, or Firm* — Harness, Dickey & Pierce, P.L.C.

(57) ABSTRACT

A mechanical switch and a semiconductor switch are connected between a load and a power supply system. A mechanical switch and a semiconductor switch are connected between the load and a secondary battery side. A control part turns on the mechanical switch, turns off the semiconductor switch, turns on the semiconductor switch and turns off the mechanical switch sequentially. In addition or alternatively, the control part turns on the mechanical switch, turns off the semiconductor switch, turns on the semiconductor switch and turns off the mechanical switch.

25 Claims, 13 Drawing Sheets

(56) References Cited

U.S. PATENT DOCUMENTS

| | | | | |
|---|---|---|---|---|
| 9,373,473 B2* | 6/2016 | Dupraz | ................. | H01H 9/542 |
| 9,384,915 B2* | 7/2016 | Cecchetti | ............... | H01H 89/00 |
| 9,564,767 B2* | 2/2017 | Takahashi | ............... | H02J 7/007 |
| 9,586,690 B2* | 3/2017 | Rajashekara | ......... | B64C 11/305 |
| 9,590,443 B2* | 3/2017 | Ju | ........................... | H02J 7/022 |
| 2014/0145503 A1* | 5/2014 | Kanayama | .............. | H02J 3/381 |
| | | | | 307/23 |

FOREIGN PATENT DOCUMENTS

| JP | 3041449 U | 9/1997 |
|---|---|---|
| JP | H11-299103 A | 10/1999 |
| JP | 2000-287458 A | 10/2000 |
| JP | 2002-315193 | 10/2002 |
| JP | 2014-107882 | 6/2014 |

* cited by examiner

AC POWER SUPPLY SOURCE SWITCHING APPARATUS

CROSS REFERENCE TO RELATED APPLICATION

This application is based on Japanese patent application NO. 2013-251180 filed on Dec. 4, 2013, the disclosure of which is incorporated herein by reference.

FIELD

The present disclosure relates to an AC power supply source switching apparatus.

BACKGROUND

Recently electric vehicles (electrically-driven vehicles), which deliver less environmental burden than conventional vehicles using fossil fuel, are under development. If the electric vehicle is required to perform the same performance as the conventional vehicle, a high-cost secondary battery need be used and hence the secondary battery impedes wide application of electric vehicles.

It is proposed to provide a system, which promotes electric vehicles by effectively using a secondary battery of an electric vehicle as an electric power source for home use (for example, JP-A-2002-315193).

This system includes a switching device, which connects either one of a commercial AC power supply system and a secondary battery to an electric load at a home and disconnects the other and the home electric load. The switching device performs either one of first and second switching states. In the first switching state, the electric power is supplied from the AC power supply system to the home load. In the second switching state, the electric power is supplied from the secondary battery to the home load.

A switching device may be formed as a comparative embodiment, which has as shown in FIG. 19 a switch 10A and a switch 10B. The switch 10A is a power supply system side switch provided between a commercial AC power supply system 4 and an electric load 3 at a home. The switch 10B is a secondary battery side switch provided between an electric vehicle 2, on which a DC secondary battery 2a and a DC-AC conversion unit 2b are mounted, and the load 3.

For example, in a case that the power supply is switched from the first switching state, in which the load 3 is connected to the AC power supply system, to the second switching state, in which the load 3 is connected to the secondary battery 2a side, it is necessary to turn on the switch 10B after turning off the switch 10A so that the AC power supply system side and the secondary battery 2a side are not connected to the load 3 at the same time. If the switches 10A and 10B are formed of electromagnetic switches, respectively, the switches 10A and 10B need long time to perform the switching from the first switching state to the second switching state. This switching time is likely to cause a temporary shut-down of electric power to the home load. If the switches 10A and 10B are formed of semiconductor switches such as triacs, respectively, the switching time may be shortened. However, a leak current flows continuously under a state that the switch 10A is in the off-state. As a result, the AC power supply system and the load 3 are half-connected to each other.

SUMMARY

It is therefore an object to provide an AC power supply source switching apparatus, which shortens a switching time required for switching from one switching state that one of an AC power supply system and a DC secondary battery is connected to an electric load, to the other switching state, in which the other of the AC power supply system and the DC secondary battery is connected to the load.

According to one aspect, an AC power supply source switching apparatus comprises: a first mechanical switch provided between a load and a power supply system, which supplies AC power as system power; a first semiconductor switch provided in series to the first mechanical switch between the load and the power supply system; a second mechanical switch provided between the load and a DC-AC conversion device, which converts DC power of a secondary battery to AC power; a second semiconductor switch provided in series to the second mechanical switch between the load and the DC-AC conversion device; and a switching control part for controlling the first and the second mechanical switches and the first and the second semiconductor switches to switch over a switching state from a first state to a second state. In the first state the load is connected to the power supply system only and disconnected from the secondary battery. In the second state, the load is connected to only the secondary battery and disconnected from the power supply system.

EMBODIMENT

Figure 1:
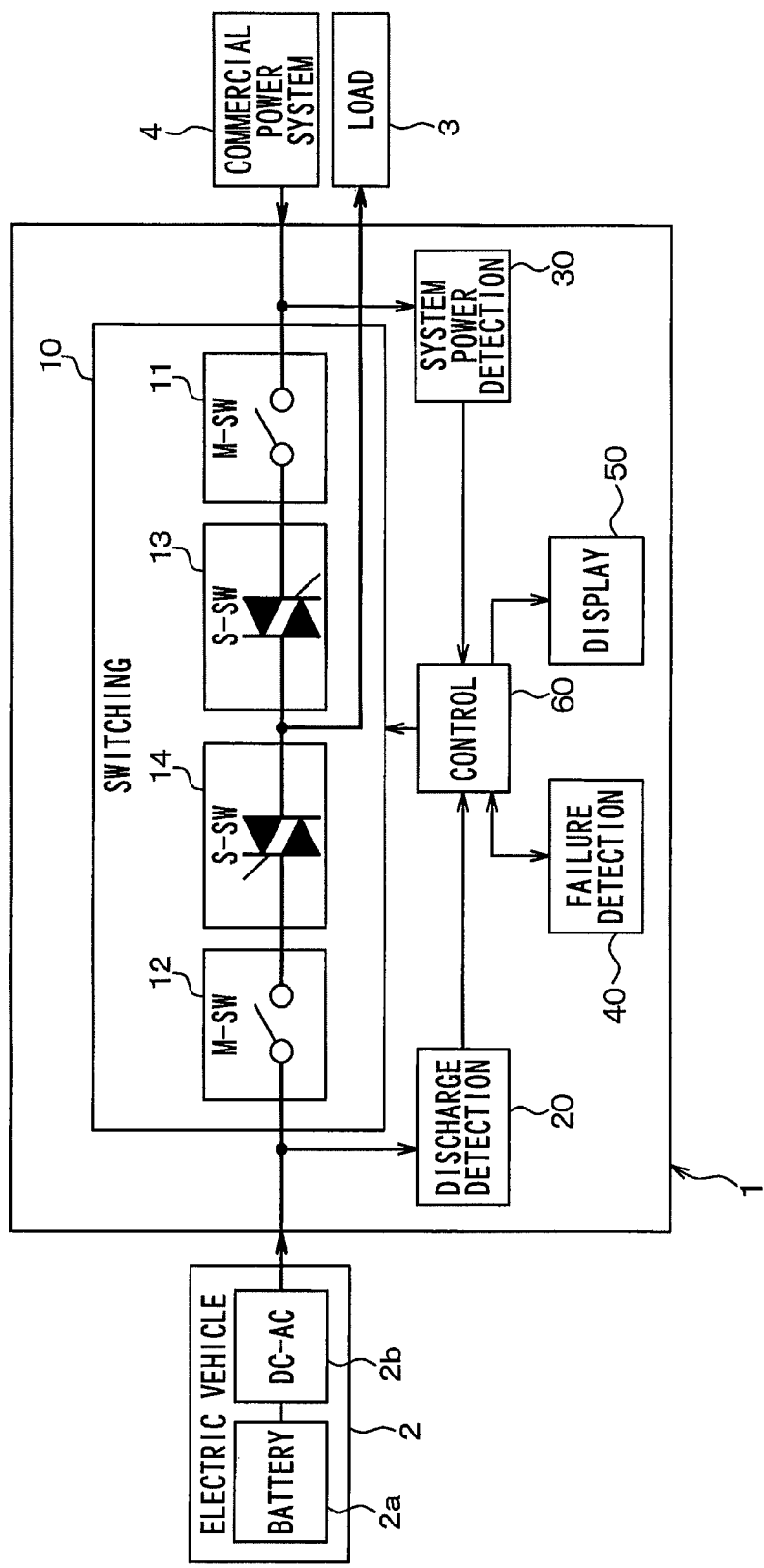
FIG. 1 is a block diagram showing an AC power supply source switching apparatus according to a first embodiment.

An AC power supply source switching apparatus will be described with reference to plural embodiments shown in the accompanying drawings. In the following embodiments, same or equivalent parts are designated with same reference numerals for brevity of description.

First Embodiment

FIG. 1 shows a circuit diagram of a first embodiment of an AC power supply source switching apparatus 1.

The AC power supply source switching apparatus 1 includes a switching part 10, a discharge detection part 20, a system power detection part 30, a failure detection part 40, a display part 50 and a control part 60.

The switching part 10 is for connecting either one of a power supply system 4 and an electric vehicle 2 to an electric load 3 at home or the like, that is, outside the vehicle 2. The electric vehicle 2 includes a secondary battery (DC battery). 2a and a DC-AC conversion device 2b. The switching part 10 includes mechanical switches 11, 12 and semiconductor switches 13, 14, which are electronic switches as opposed to the mechanical switches. The semiconductor switch requires shorter response time than the mechanical switch in completing respective turn-on and turn-off operations. The mechanical switch and the semiconductor switch are labeled as M-SW and S-SW in FIG. 1 and other figures. The load 3 is an electric device such as home electric appliances provided in each home. The power supply system 4 is a commercial AC power supply system for supplying homes and facilities with two-phase AC electric power.

The mechanical switch 11 and the semiconductor switch 13, which form a first mechanical switch and a first semiconductor switch, respectively, are connected in series between the power supply system 4 and the load 3. The mechanical switch 11 is positioned at the power supply system 4 side relative to the semiconductor switch 13. That is, the mechanical switch 11 is provided between the power supply system 4 and the semiconductor switch 13. The mechanical switch 12 and the semiconductor switch 14, which form a second mechanical switch and a second semiconductor switch, respectively, are connected in series between the DC-AC conversion device 2b of the electric vehicle 2 and the load 3. The mechanical switch 12 is located at the DC-AC conversion unit 2b side relative to the semiconductor switch 14. That is, the mechanical switch 12 is provided between the semiconductor switch 14 and the DC-AC conversion device 2b. In the following description, the mechanical switches 11, 12 and the semiconductor switches 13, 14 are occasionally referred to simply as switches 11 to 14, respectively.

In the electric vehicle 2 having the secondary battery 2a and the DC-AC conversion unit 2b, the DC-AC conversion unit 2b converts DC power outputted from the secondary battery 2a to two-phase AC power. The secondary battery 2a is primarily for supplying electric power to an electric motor for travel of the vehicle, and is a lithium-ion battery, for example.

Each of the mechanical switches 11 and 12 is a contact-type relay switch having a fixed contact and a movable contact. The contact-type relay switch connects its two terminals under an on-state, in which its movable contact contacts its fixed contact thereby to connect the two terminals to allow current flow. The contact-type relay switch disconnects its two terminals under an off-state, in which its movable contact is disengaged from its fixed contact. For example, in the mechanical switch 11, the two terminals are formed of terminals, one of which is on the power supply system 4 side and the other of which is on the semiconductor switch 13 side.

Each of the semiconductor switches 13 and 14 is an AC semiconductor switch such as a triac, which allows current flow in both directions. The discharge detection part 20 monitors AC power discharged from the secondary battery 2a to the load 3 side through the DC-AC conversion unit 2b. The system power detection part 30 monitors AC power discharged from the power supply system 4 to the load 3 side. In the following description, the AC power discharged from the power supply system 4 to the load 3 side is referred to as system power. Similarly, the AC power discharged from the secondary battery 2a to the load 3 side through the DC-AC conversion unit 2b is referred to as discharge power.

The failure detection part 40 checks whether each of the switches 11 to 14 is failing. Specifically, the failure detection part 40 detects a voltage between the two terminals of each of the switches 11 to 14 and checks whether each switch is failing based on a detected voltage. The display part 50 is a display panel for displaying various information such as failure information of the switches 11 to 14. The control part 60 is formed of a microcomputer, a memory and the like and executes programmed switching processing to control the switches 11 to 14.

Figure 2:
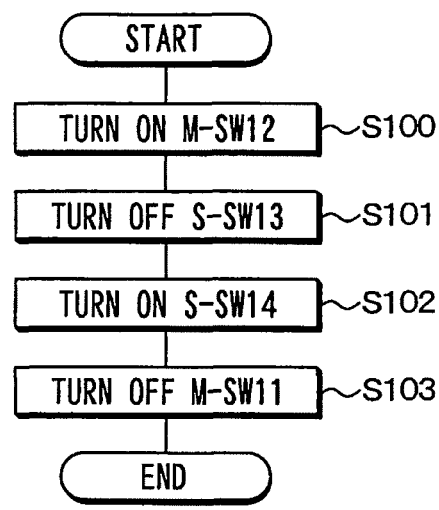
FIG. 2 is a flowchart showing switching processing executed by a control part shown in FIG. 1 according to the first embodiment.
Figure 3:
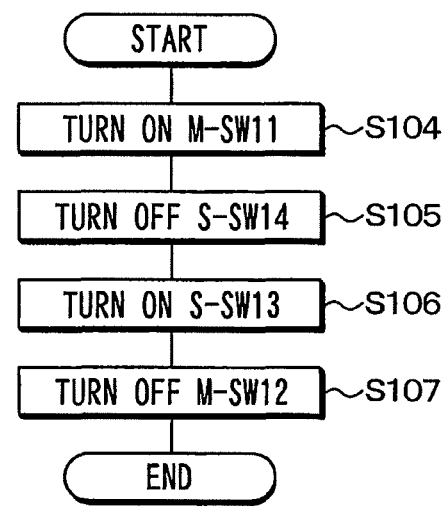
FIG. 3 is a flowchart showing switching processing executed by the control part according to the first embodiment.

The switching processing executed by the control part 60 in the first embodiment will be described next with reference to FIG. 2 and FIG. 3. FIG. 2 is a flowchart showing switching processing for switching over a switching state from a state that the load 3 is connected to the power supply system 4 side to a state that the load 3 is connected to the secondary battery 2a side. FIG. 3 is a flowchart showing switching processing for switching over a switching state from a state that the load 3 is connected to the secondary battery 2a side to a state that the load 3 is connected to the power supply system 4 side. The switching processing of FIG. 2 and the switching processing of FIG. 3 will be described below.

(Switching Processing of FIG. 2)

The control part 60 executes the switching processing as shown in the flowchart of FIG. 2.

First, the control part 60 turns on the mechanical switch 12 at step 100. Thus the DC-AC conversion unit 2b and the semiconductor switch 14 are connected.

The control part 60 then turns off the semiconductor switch 13 step 101. Thus the mechanical switch 11 and the load 3 are disconnected.

The control part 60 then quickly turns on the semiconductor switch 14 at step 102. Thus the mechanical switch 12 and the load 3 are connected. That is, the load 3 and the DC-AC conversion unit 2b are connected through the mechanical switch 12 and the semiconductor switch 14.

The control part 60 then turns off the mechanical switch 11 at step 103. Thus the semiconductor switch 13 and the power supply system 4 are disconnected. That is, the load 3 and the power supply system 4 are disconnected by the semiconductor switch 13 and the mechanical switch 11.

Figure 4:
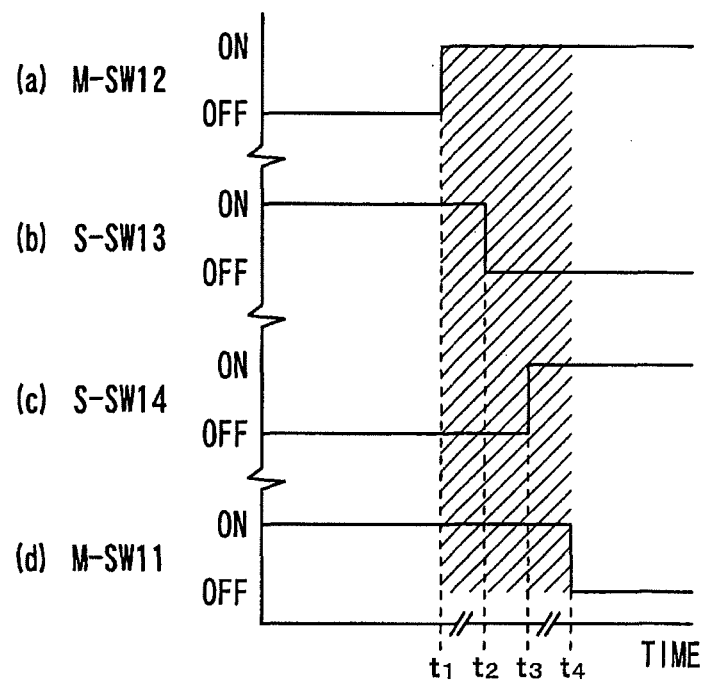
FIG. 4 is a time chart showing switching processing executed by the control part according to the first embodiment.

As described above, since the mechanical switch 11 is turned off after the semiconductor switch 13 is turned off, the load 3 and the power supply system 4 can be disconnected by the mechanical switch 11 in a short time as shown in FIG. 4. Further, since the semiconductor switch 14 is turned on after the mechanical switch 12 is turned on, the DC-AC conversion unit 2b and the load 3 can be connected to each other in a short time. For this reason, a switching time required for the switching part 10 to switch over the switching state from the state that the power supply system 4 is connected to the load 3 to the state that the secondary battery 2a is connected to the load 3.

In FIG. 4, the switching time between time t1 for turning on the mechanical switch 12 and time t4 for turning off the mechanical switch 11 is assumed to be 500 msec., and the switching time between time t2 for turning off the semiconductor switch 13 and time t3 for turning on the semiconductor switch 14 is assumed to be 10 msec.

(Switching Processing of FIG. 3)

The control part 60 executes the switching processing as shown in the flowchart of FIG. 3.

First, the control part 60 turns on the mechanical switch 11 at step 104. Thus the power supply system 4 and the semiconductor switch 13 are connected.

The control part 60 then turns off the semiconductor switch 14 at step 105. Thus the mechanical switch 12 and the load 3 are disconnected.

The control part 60 then quickly turns on the semiconductor switch 13 at step 106. Thus the mechanical switch 11 and the load 3 are connected. That is, the load 3 and the power supply system 4 are connected through the mechanical switch 11 and the semiconductor switch 13.

The control part 60 then turns off the mechanical switch 12 at step 107. Thus the semiconductor switch 14 and the DC-AC conversion unit 2b are disconnected. That is, the load 3 and the DC-AC conversion unit 2b are disconnected by the mechanical switch 12 and the semiconductor switch 14.

As described above, since the mechanical switch 12 is turned off after the semiconductor switch 14 is turned off, the load 3 and the DC-AC conversion unit 2b can be disconnected by the mechanical switch 12 in a short time. Further, since the semiconductor switch 13 is turned on after the mechanical switch 11 is turned on, the power supply system 4 and the load 3 can be connected to each other in a short time.

For this reason, a switching time required for the switching part 10 to switch over the switching state from the state that the secondary battery 2a is connected to the load 3 to the state that the power supply system 4 is connected to the load 3, is shortened.

According to the first embodiment described above, the switching time required for switching the switching state, in which either one of the power supply system 4 side and the secondary battery 2a side are connected to the load 3 and the other of the two and the load 3 are disconnected, to the state that the other of the two and the load 3 are connected and the one of the two and the load 3 are disconnected, is shortened.

Second Embodiment

A second embodiment is an example, in which the switching state is switched over after confirming that sufficient discharge power is available in the first embodiment. That is, after confirming the sufficient discharge power in excess of a predetermined discharge power threshold value is available, the switching state is switched over from the state that the load 3 is connected to the power supply system 4 to the state that the load 3 is connected to the secondary battery. 2a side. Further, after confirming that sufficient system power in excess of a predetermined system power threshold value is available, the switching state is switched over from the state that load 3 is connected to the secondary battery 2a to the state that the load 3 is connected to the power supply system 4 side.

Figure 5:
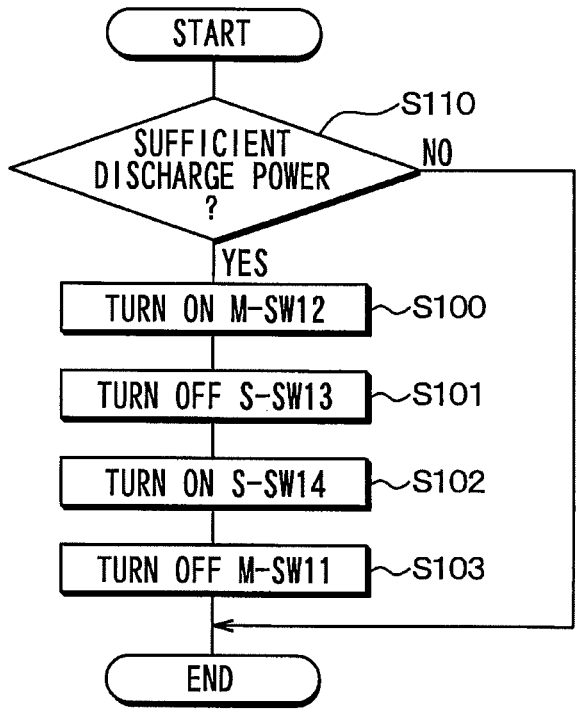
FIG. 5 is a flowchart showing switching processing executed by the control part according to a second embodiment.
Figure 6:
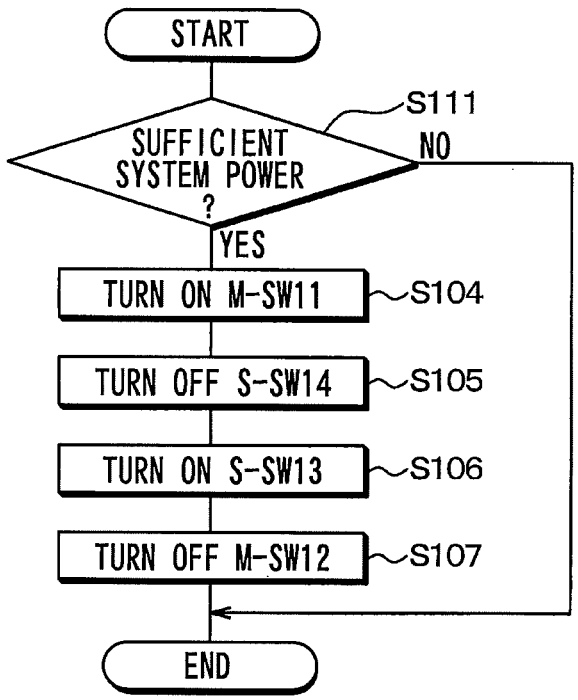
FIG. 6 is a flowchart showing switching processing executed by the control part according to the second embodiment.

The switching processing executed by the control part 60 in the second embodiment will be described with reference to FIG. 5 and FIG. 6. FIG. 5 is a flowchart showing switching processing for switching over the switching state from the state that the load 3 is connected to the power supply system 4 side to the state that the load 3 is connected to the secondary battery 2a side. FIG. 6 is a flowchart showing switching processing for switching over the switching state from the state that the load 3 is connected to the secondary battery 2a side to the state that the load 3 is connected to the power supply system 4 side. The switching processing of FIG. 5 and the switching processing of FIG. 6 will be described below.

(Switching Processing of FIG. 5)

The control part 60 executes the switching processing as shown in the flowchart of FIG. 5.

In FIG. 5, step 110 is provided to be executed before steps 100, 101, 102 and 103 in FIG. 2. Step 110 is for checking based on the detection signal of the discharge detection part 20 whether the discharge power, which is supplied from the secondary battery 2a to the load 3 side through the DC-AC conversion unit 2b, is sufficient.

When a check result is YES at step 110 based on the detection signal of the discharge detection part 20 thereby indicating that the sufficient discharge power to be supplied from the secondary battery 2a side to the load 3 side is available based on the discharge detection part 20, each of steps 100, 101, 102 and 103 is executed in the similar manner as in the first embodiment (FIG. 2). That is, after confirming that the secondary battery 2a has sufficient discharge power, the switching state is switched over from the state that the load 3 is connected to the power supply system 4 to the state that the load 3 is connected to the secondary battery 2a side.

When a check result is NO at step 110 based on the detection signal of the discharge detection part 20 thereby indicating that the sufficient discharge power is not available from the secondary battery 2a side to the load 3 side, the switching processing is finished.

(Switching Processing of FIG. 6)

The control part 60 executes the switching processing as shown in the flowchart of FIG. 6.

In FIG. 6, step 111 is provided to be executed before steps 104, 105, 106 and 107 in FIG. 3. Step 111 is for checking based on the detection signal of the system power detection part 30 whether supply power, which is supplied from the power supply system 4 to the load 3, is sufficient.

When a check result is YES at step 111 based on the detection signal of the system power detection part 30 thereby indicating that the sufficient system power to be supplied from the power supply system 4 to the load 3 side is available, each of steps 104, 105, 106 and 107 is executed in the similar manner as in the first embodiment (FIG. 3). That is, after confirming that the power supply system 4 has the sufficient system power, the switching state is switched over from the state that the load 3 is connected to the secondary battery 2*a* side to the state that the load 3 is connected to the power supply system 4 side.

When a check result at step 111 is NO based on the detection signal of the system power detection part 30 thereby indicating that the sufficient system power is not available from the power supply system 4 to the load 3, the switching processing is finished.

According to the second embodiment described above, the control part 60 causes the switching part 10 to switch over the switching state from the state that the load 3 is connected to the power supply system 4 to the state that the load 3 is connected to the secondary battery 2*a* side after confirming that the secondary battery 2*a* has the sufficient discharge power. Thus the electric power can be supplied to the load 3 after the load 3 is connected to the secondary battery 2*a*. The control part 60 causes, after confirming that the power supply system 4 has the sufficient system power, the switching part 10 to switch over the switching state from the state that the load 3 is connected to the secondary battery 2*a* side to the state that the load 3 is connected to the power supply system 4. The electric power can be supplied to the load 3 after the load 3 is connected to the power supply system 4.

Third Embodiment

A third embodiment is an example, in which the switching state is switched over after confirming that the sufficient system power or the sufficient discharge power is not available in the second embodiment. That is, after confirming that the sufficient system power is not available, the switching state is switched over from the state that the load 3 is connected to the power supply system 4 to the state that the load 3 is connected to the secondary battery 2*a* side. Further, after confirming that sufficient discharge power is not available, the switching state is switched over from the state that load 3 is connected to the secondary battery 2*a* side to the state that the load 3 is connected to the power supply system 4 side.

Figure 7:
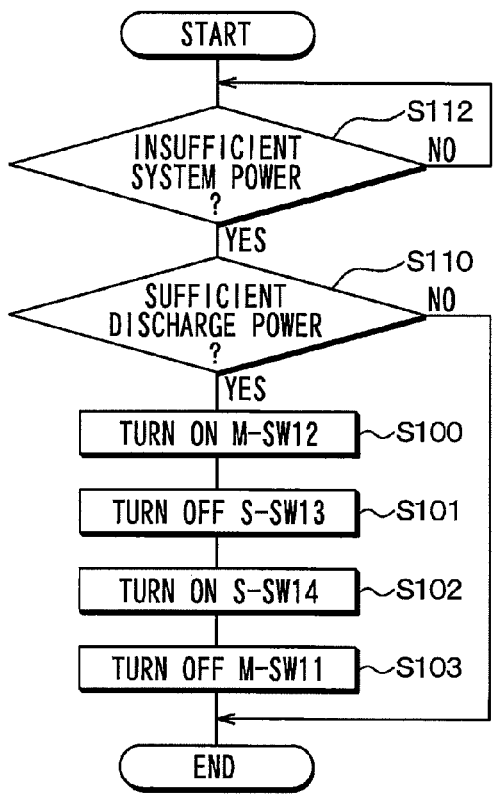
FIG. 7 is a flowchart showing switching processing executed by the control part according to a third embodiment.
Figure 8:
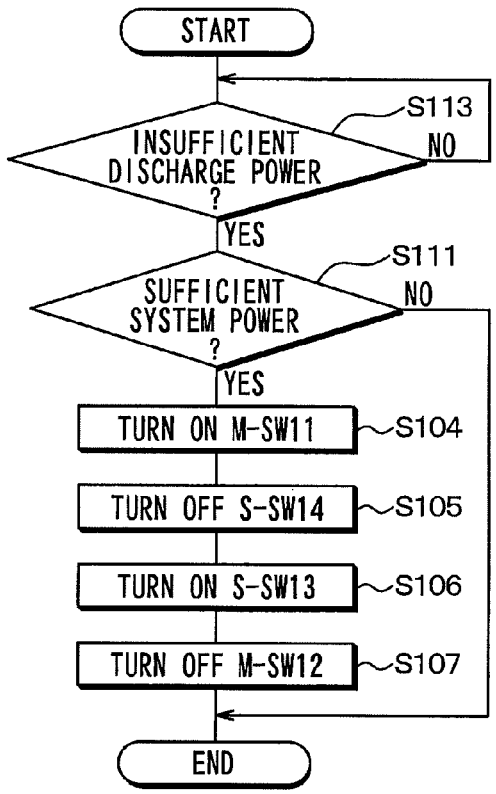
FIG. 8 is a flowchart showing switching processing executed by the control part according to the third embodiment.

The switching processing executed by the control part 60 in the second embodiment will be described with reference to FIG. 7 and FIG. 8. FIG. 7 is a flowchart showing switching processing for switching over the switching state from the state that the load 3 is connected to the power supply system 4 side to the state that the load 3 is connected to the secondary battery 2*a* side. FIG. 8 is a flowchart showing switching processing for switching over the switching state from the state that the load 3 is connected to the secondary battery 2*a* side to the state that the load 3 is connected to the power supply system 4 side. The switching processing of FIG. 7 and the switching processing of FIG. 8 will be described below.

(Switching Processing of FIG. 7)

The control part 60 executes the switching processing as shown in the flowchart of FIG. 7.

In FIG. 7, step 112 is provided to be executed before steps 110, 100, 101, 102 and 103 in FIG. 5 are executed.

Step 112 is for checking based on the detection signal of the system power detection part 30 whether the system power, which is supplied from the power supply system 4, is insufficient, that is smaller than the predetermined system power threshold value.

When a check result is YES at step 110 based on the detection signal of the system power detection part 30 thereby indicating that the system power to be supplied from the power supply system 4 to the load 3 side is insufficient, each of steps 110, 100, 101, 102 and 103 is executed in the similar manner as in the second embodiment (FIG. 5).

When a check result is NO at step 112 based on the detection signal of the discharge detection part 20 thereby indicating that the sufficient discharge power is available from the secondary battery 2*a* to the load 3 side through the DC-AC conversion unit 2*b*, step 112 is repeated.

(Switching Processing of FIG. 8)

The control part 60 executes the switching processing as shown in the flowchart of FIG. 8.

In FIG. 8, step 113 is provided to be executed before steps 111, 104, 105, 106 and 107 in FIG. 6. Step 113 is for checking based on the detection signal of the discharge detection part 20 whether the discharge power, which is supplied from the secondary battery 2*a* through the DC-AC conversion unit 2*b*, is insufficient, that is, smaller than the predetermined discharge power threshold value.

When a check result is YES at step 112 based on the detection signal of the discharge detection part 20 thereby indicating that the discharge power to be supplied from the secondary battery 2*a* to the load 3 side through the DC-AC conversion unit 2*b* is insufficient, each of steps 111, 104, 105, 106 and 107 is executed in the similar manner as in the second embodiment (FIG. 6).

When a check result is NO at step 113 based on the detection signal of the discharge detection part 20 thereby indicating that the sufficient discharge power is available from the secondary battery 2*a* to the load 3 side through the DC-AC conversion unit 2*b*, step 113 is repeated.

According to the third embodiment described above, the control part 60 causes the switching part 10 to switch over the switching state from the state that the load 3 is connected to the power supply system 4 to the state that the load 3 is connected to the secondary battery 2*a* side after determining that the system power available from the power supply system 4 is insufficient but the discharge power from the secondary battery 2*a* side is sufficient. The control part 60 causes, after determining that the discharge power from the secondary battery 2*a* side is insufficient but the system power from the power supply system 4 is sufficient, the switching part 10 to switch over the switching state from the state that the load 3 is connected to the secondary battery 2*a* side to the state that the load 3 is connected to the power supply system 4 side. Thus, even when the system power or the discharge power becomes insufficient, the electric power can be supplied to the load 3 stably by controlling the switching part 10 by the control part 60.

Fourth Embodiment

A fourth embodiment is an example, in which any failure among the switches 11 to 14 is notified externally when it is determined that any one of the switches 11 to 14 has a failure or abnormality when the switching state is switched over by the switching part 10 from the state that the load 3 is connected to the power supply system 4 to the state that the load 3 is connected to the secondary battery 2*a* side.

Figure 9:
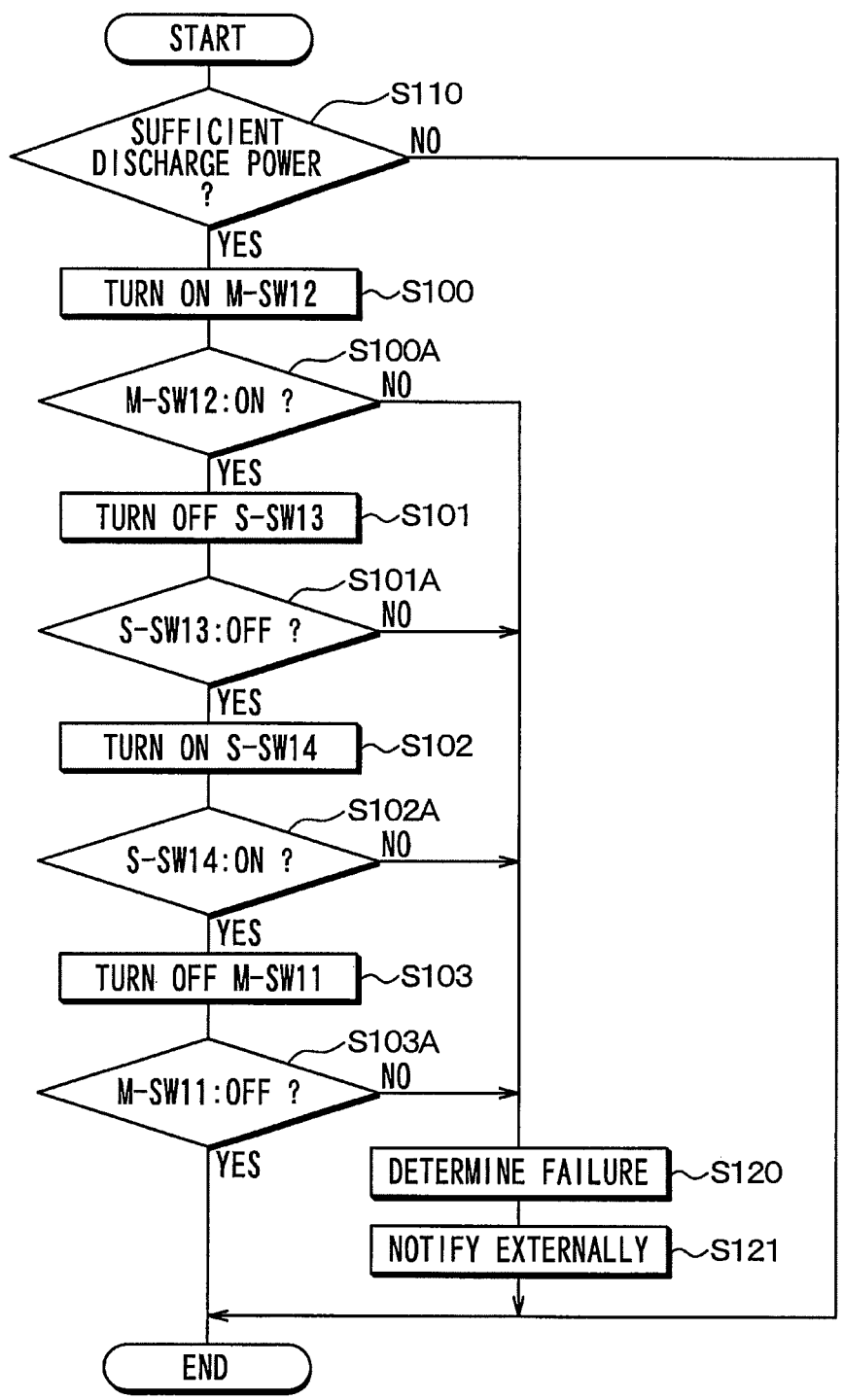
FIG. 9 is a flowchart showing switching processing executed by the control part according to a fourth embodiment.
Figure 10:
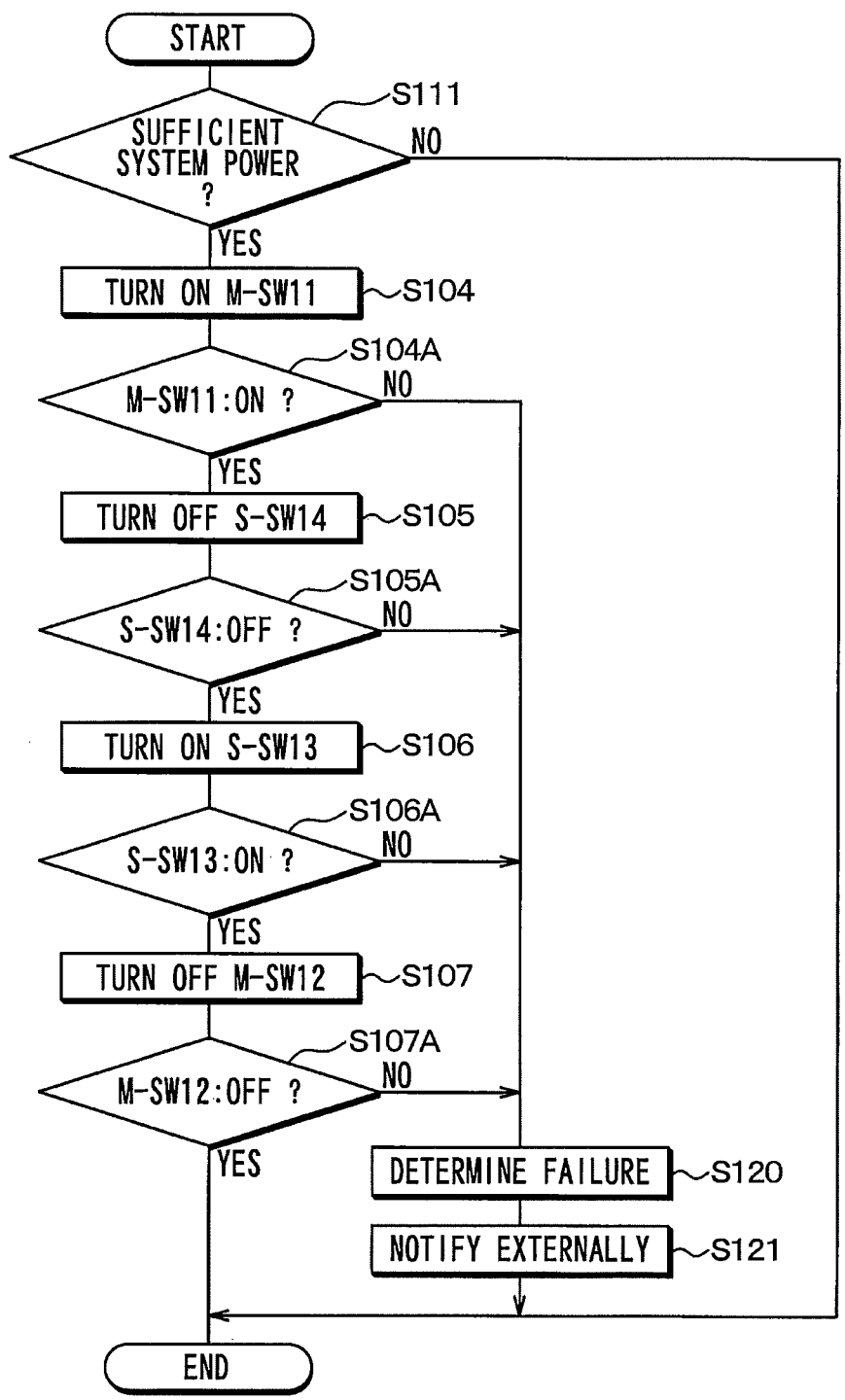
FIG. 10 is a flowchart showing switching processing executed by the control part according to the fourth embodiment.

The switching processing executed by the control part 60 in the fourth embodiment will be described with reference to FIG. 9 and FIG. 10. FIG. 9 is a flowchart showing switching processing for switching over the switching state from the state that the load 3 is connected to the power supply system 4 side to the state that the load 3 is connected to the secondary battery 2a side. FIG. 10 is a flowchart showing switching processing for switching over the switching state from the state that the load 3 is connected to the secondary battery 2a side to the state that the load 3 is connected to the power supply system 4 side. The switching processing of FIG. 9 and the switching processing of FIG. 10 will be described below.

(Switching Processing of FIG. 9)

The control part 60 executes the switching processing as shown in the flowchart of FIG. 9.

In FIG. 9, steps 100A, 101A, 102A and 103A are provided further in the flowchart of FIG. 5.

Step 100A is for checking whether the mechanical switch 12 is actually turned on after step 100 is executed. Specifically, it is checked whether a voltage (referred to as an inter-terminal voltage) between an input-side terminal and an output-side terminal of the mechanical switch 12, which is detected by the failure detection part 40, is equal to or larger than a predetermined voltage threshold value. When the inter-terminal voltage is equal to or larger than the predetermined threshold value, a check result is NO at step 100A thereby indicating at step 120 that the mechanical switch 12 is not turned on and hence the mechanical switch 12 is failing. Then it is displayed on the display part 50 at step 121 that the switch 12 has a failure.

When the inter-terminal voltage of the mechanical switch 12 is lower than the predetermined threshold value, a check result is YES at step 100A thereby indicating that the mechanical switch 12 is actually turned on. Then the semiconductor switch 13 is turned off at step 101.

It is further checked at step 101A whether the semiconductor switch 13 is actually turned off. Specifically, it is checked whether a voltage (referred to as inter-terminal voltage) between input-side and output-side terminals of the semiconductor switch 13, which is detected by the failure detection part 40, is smaller than a predetermined voltage threshold value. When the inter-terminal voltage is smaller than the predetermined threshold value, a check result is NO thereby determining at step 120 that the semiconductor switch 13 is not turned off and hence the semiconductor switch 13 is failing. Then it is displayed on the display part 50 at step 121 that the switch 13 has a failure.

When the inter-terminal voltage of the semiconductor switch 13 is equal to or larger than the predetermined value, a check result is YES at step 101A thereby indicating that the semiconductor switch 13 is actually turned off. Then the semiconductor switch 14 is turned on at step 102.

It is further checked at step 102A whether the semiconductor switch 14 is actually turned on. Specifically, it is checked whether a voltage (referred to as inter-terminal voltage) between two terminals of the semiconductor switch 14, which is detected by the failure detection part 40, is equal to or larger than a predetermined threshold voltage value. When the inter-terminal voltage is equal to or larger than the predetermined value, a check result is NO at step 102A thereby determining at step 120 that the semiconductor switch 14 is not turned on and hence the semiconductor switch 14 is failing. Then it is displayed on the display part 50 that the switch 14 has a failure at step 121.

When the inter-terminal voltage of the mechanical switch 12 is lower than the predetermined threshold value, a check result is YES at step 102A thereby indicating that the semiconductor switch 14 is actually turned on. Then the mechanical switch 11 is turned on at step 103.

It is further checked at step 103A whether the mechanical switch 11 is actually turned off. Specifically, it is checked whether a voltage (referred to as inter-terminal voltage) between two terminals of the mechanical switch 11, which is detected by the failure detection part 40, is equal to or larger than a predetermined voltage threshold value. When the inter-terminal voltage is smaller than the predetermined threshold value, a check result is NO thereby determining at step 120 that the mechanical switch 11 is not turned off and hence the mechanical switch 11 is failing. Then it is displayed on the display part 50 that the switch 11 has a failure at step 121.

When the inter-terminal voltage of the mechanical switch 11 is equal to or larger than the predetermined threshold value, a check result is YES at step 103A thereby indicating that the semiconductor switch 13 is actually turned off.

As described above, it is checked at steps 100A, 101A, 102A and 103A individually whether the switches 11 to 14 have respective failures. When it is determined that any one of the switches has the failure, such a failure is displayed on the display part 50.

(Switching Processing of FIG. 10)

The control part 60 executes the switching processing as shown in the flowchart of FIG. 10. In FIG. 10, steps 104A, 105A, 106A and 107A are provided in the flowchart of FIG. 6.

Step 104A is for checking whether the mechanical switch 11 is actually turned on after step 104 is executed. Here, similarly to step 100A, an inter-terminal voltage between the two terminals of the mechanical switch 11 is detected by the failure detection part 40. When the inter-terminal voltage is equal to or larger than the predetermined threshold value, a check result is NO at step 104A thereby indicating that the mechanical switch 11 is not actually turned on. Hence the mechanical switch 11 is determined to be failing at step 120. Then it is displayed on the display part 50 that the switch 11 has a failure at step 121.

When the inter-terminal voltage of the mechanical switch 11 is lower than the predetermined threshold value, a check result is YES at step 104A thereby indicating that the mechanical switch 11 is actually turned on. Then the semiconductor switch 14 is turned off at step 105.

It is further checked at step 105A whether the semiconductor switch 14 is actually turned off. Specifically, similarly to step 101A, the inter-terminal voltage between the two terminals of the semiconductor switch 14 is detected by the failure detection part 40. When the inter-terminal voltage is smaller than the predetermined threshold value, a check result is NO thereby indicating that the semiconductor switch 14 is not actually turned off. It is thus determined that the semiconductor switch 14 is failing at step 120. Then it is displayed on the display part 50 that the switch 14 has a failure at step 121.

When the inter-terminal voltage of the semiconductor switch 14 is equal to or larger than the predetermined threshold value, a check result is YES at step 105A thereby indicating that the semiconductor switch 14 is actually turned off. Then the semiconductor switch 13 is turned on at step 106.

It is further checked at step 106A whether the semiconductor switch 13 is actually turned on. Specifically, similarly to step 102A, the inter-terminal voltage between the two terminals of the semiconductor switch 13 is detected by the failure detection part 40. When the inter-terminal voltage is equal to or larger than the predetermined value, a check result is NO at step 106A thereby indicating that the semiconductor switch 13 is not actually turned on. It is thus determined at step 120 that the semiconductor switch 13 is failing. Then it is displayed on the display part 50 at step 121 that the switch 13 has a failure.

When the inter-terminal voltage of the semiconductor switch 13 is lower than the predetermined threshold value, a check result is YES at step 106A thereby indicating that the semiconductor switch 13 is actually turned on. Then the mechanical switch 12 is turned on at step 107.

At step 107A, the inter-terminal voltage between the two terminals of the mechanical switch 12 is detected by the failure detection part 40. When the inter-terminal voltage is smaller than the predetermined threshold value, a check result is NO at step 107A thereby indicating that the mechanical switch 12 is not actually turned off. Thus the mechanical switch 12 is determined at step 120 to be failing. Then it is displayed on the display part 50 that the switch 12 has a failure at step 121.

When the inter-terminal voltage of the mechanical switch 12 is equal to or larger than the predetermined threshold value, a check result is YES at step 107A thereby indicating that the mechanical switch 12 is actually turned off.

As described above, it is checked at steps 104A, 105A, 106A and 107A individually whether the switches 11 to 14 have respective failures. When it is determined that any one of the switches 11 to 14 has the failure, such a failure is displayed on the display part 50.

According to the fourth embodiment described above, when it is determined that any one of the switches 11 to 14 is failing, such a failure is displayed on the display part 50. Thus it is possible to notify externally that failure is present in the switches 11 to 14.

Fifth Embodiment

A fifth embodiment is an example, in which the switching state that the load 3 is connected to the power supply system 4 is restored when it is determined that any of switches 11 to 14 has a failure at the time of switching of the switching state from the state that the load 3 is connected to the power supply system 4 to the state that the load 3 is connected to the secondary battery 2a side.

Figure 11:
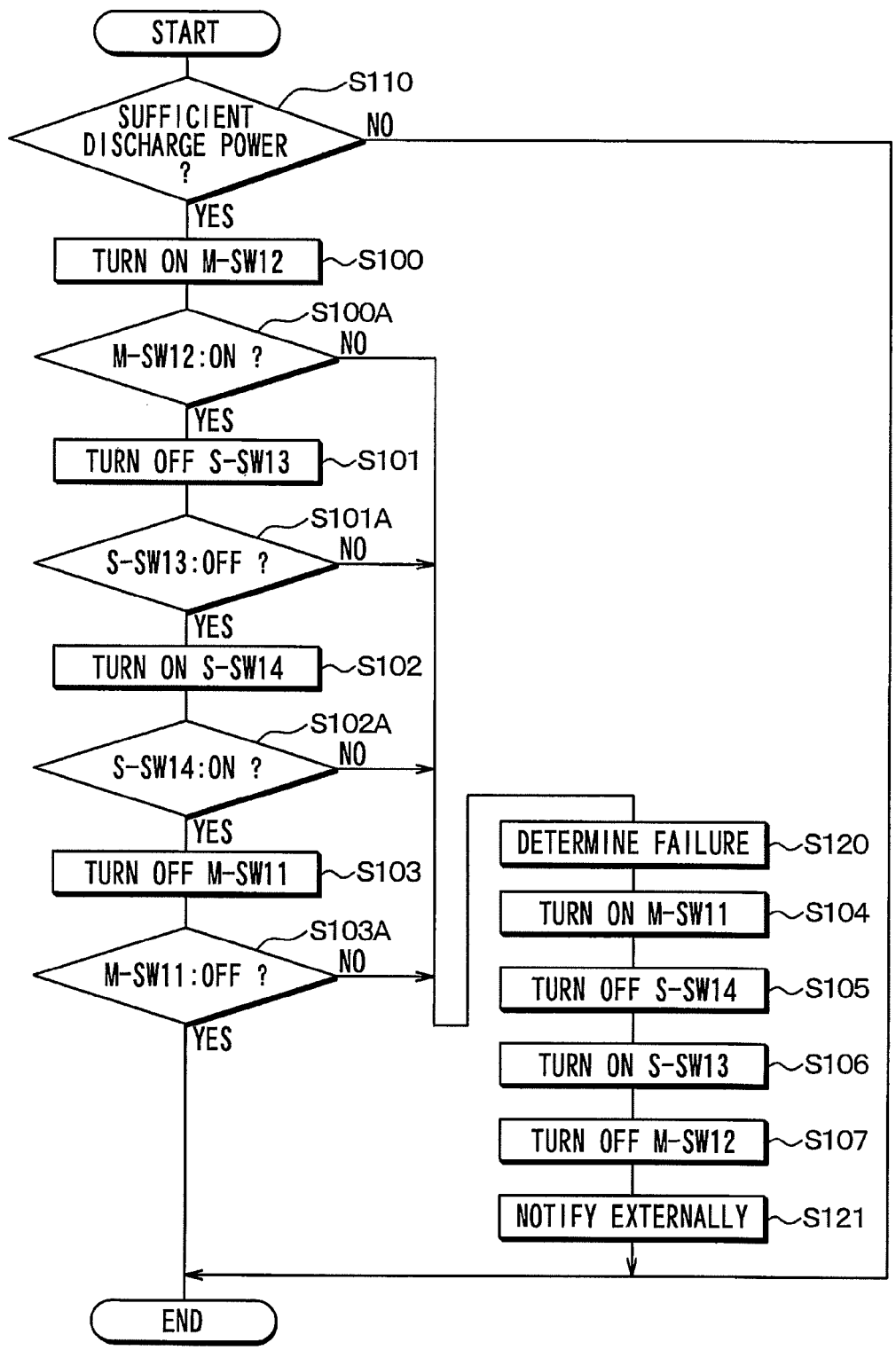
FIG. 11 is a flowchart showing switching processing executed by the control part according to a fifth embodiment.
Figure 12:
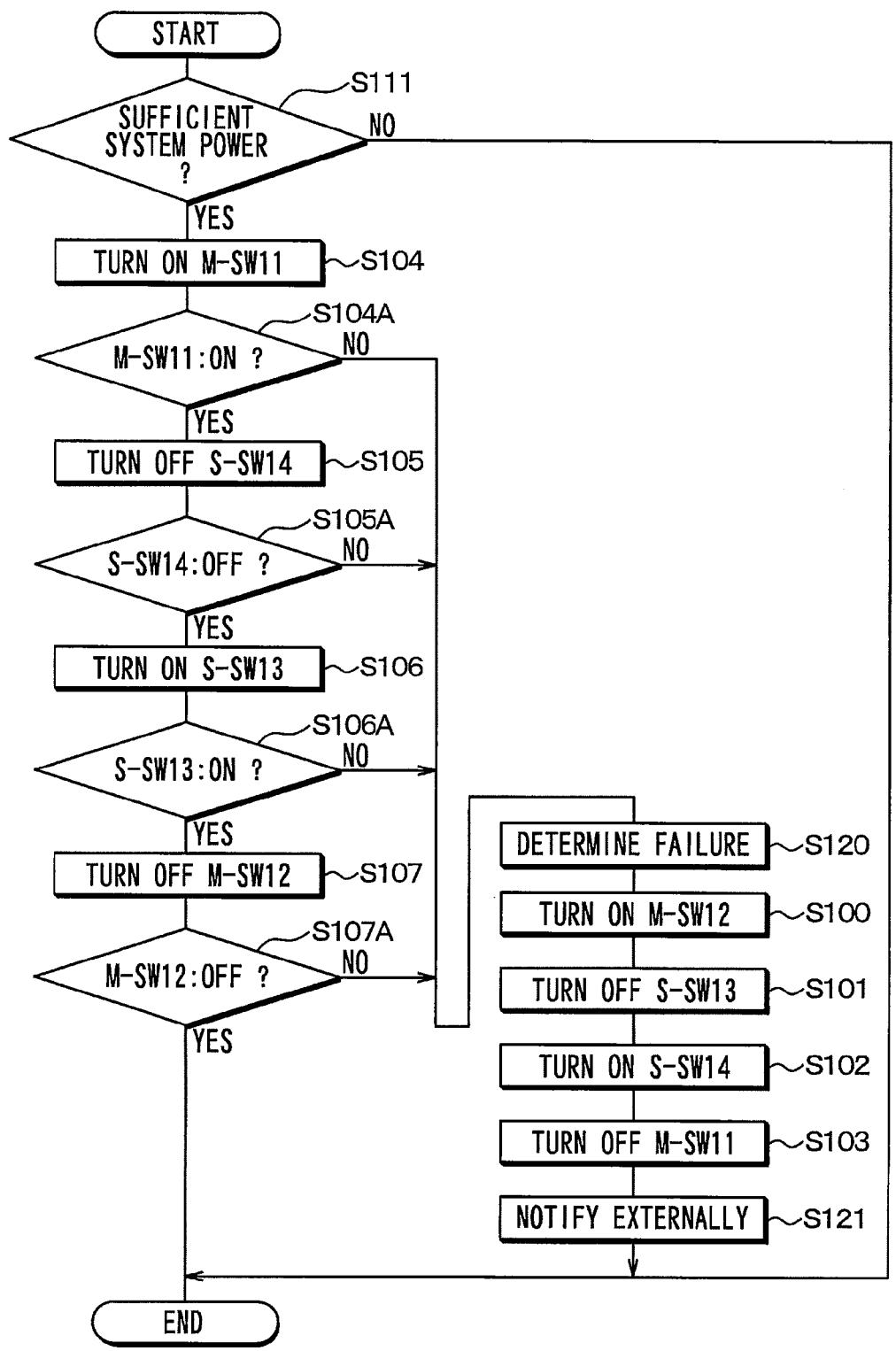
FIG. 12 is a flowchart showing switching processing executed by the control part according to the fifth embodiment.

The switching processing executed by the control part 60 in the fifth embodiment will be described with reference to FIG. 11 and FIG. 12. FIG. 11 is a flowchart showing switching processing for switching over the switching state from the state that the load 3 is connected to the power supply system 4 side to the state that the load 3 is connected to the secondary battery 2a side. FIG. 12 is a flowchart showing switching processing for switching over the switching state from the state that the load 3 is connected to the secondary battery 2a side to the state that the load 3 is connected to the power supply system 4 side. The switching processing of FIG. 11 and the switching processing of FIG. 12 will be described below.

(Switching Processing of FIG. 11)

The control part 60 executes the switching processing as shown in the flowchart of FIG. 11.

In FIG. 11, steps 104, 105, 106 and 107 of FIG. 3 are provided between step 120 and step 121 in FIG. 9. Steps 104, 105, 106 and 107 are executed after checking at steps 100A, 101A, 102A and 103A and determining at step 120 that either one of the switches 11 to 14 has a failure. Thus the switching state that the load 3 is connected to the power supply system 4 is resumed by the switching part 10. Then step 121 is executed to notify externally.

(Switching Processing of FIG. 12)

The control part 60 executes the switching processing as shown in the flowchart of FIG. 12.

In FIG. 12, steps 100, 101, 102 and 103 of FIG. 2 are provided between step 120 and step 121 in FIG. 10. Steps 100, 101, 102 and 103 are executed after checking at steps 104A, 105A, 106A and 107A and determining at step 120 that either one of the switches 11 to 14 has a failure. Thus the switching state that the load 3 is connected to the battery 3a side is resumed by the switching part 10. Then step 121 is executed According to the fifth embodiment described above, the control part 60 can return the switching state to the state that the load 3 is connected to the power supply system 4 when it is determined that any of the switches 11 to 14 has a failure at the time of switching of the switching state from the state that the load 3 is connected to the power supply system 4 to the state that the load 3 is connected to the secondary battery 2a side. The control part 60 can return the switching state to the state that that the load 3 is connected to the secondary battery 2a side when it is determined that any switch 11 to 14 has a failure at the time of switching of the switching state from the state that the load 3 is connected to battery 2a side to the state that the load 3 is connected to the power supply system 4.

Sixth Embodiment

A sixth embodiment is an example, in which the switching state is switched over from the state that the load 3 is connected to the power supply system 4 to the state that the load 3 is connected to the secondary battery 2a side, when the mechanical switch 11 or the semiconductor switch 13 is failing in the state that the load 3 is connected to the power supply system 4 in the first embodiment.

Figure 13:
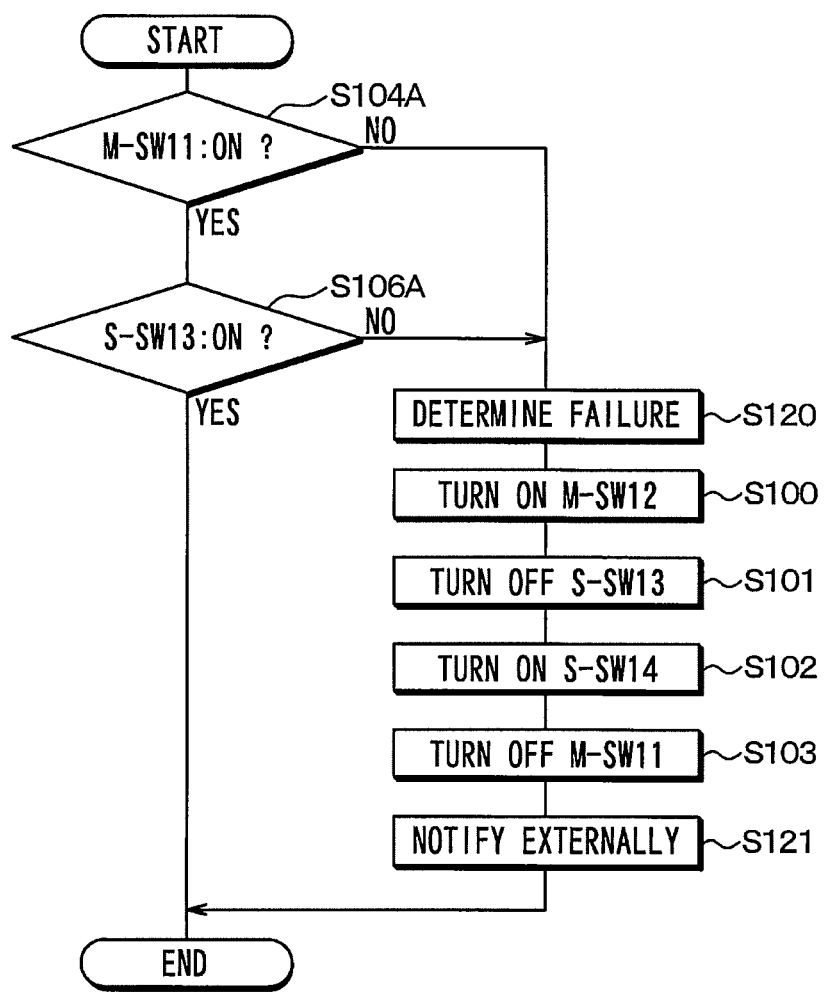
FIG. 13 is a flowchart showing switching processing executed by the control part according to a sixth embodiment.
Figure 14:
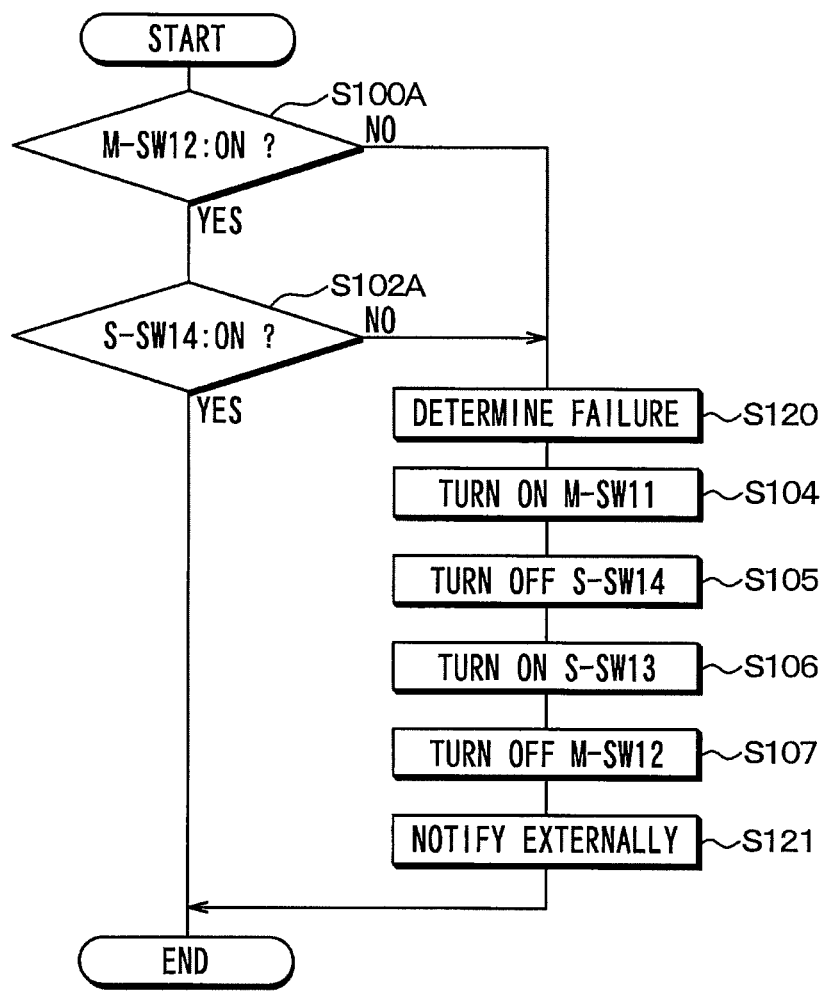
FIG. 14 is a flowchart showing switching processing executed by the control part according to the sixth embodiment.

The switching processing executed by the control part 60 in the sixth embodiment will be described with reference to FIG. 13 and FIG. 14. FIG. 13 is a flowchart showing switching processing for switching over the switching state from the state that the load 3 is connected to the power supply system 4 side to the state that the load 3 is connected to the secondary battery 2a side. FIG. 14 is a flowchart showing switching processing for switching over the switching state from the state that the load 3 is connected to the secondary battery 2a side to the state that the load 3 is connected to the power supply system 4 side. The switching processing of FIG. 13 and the switching processing of FIG. 14 will be described below.

(Switching Processing of FIG. 13)

The control part 60 executes the switching processing as shown in the flowchart of FIG. 13.

In FIG. 13, steps 104A and 106A of FIG. 10 are provided to be executed before steps 100, 101, 102 and 103 are executed.

It is checked at step 104A whether the mechanical switch 11 is actually turned on. When a check result is NO at step 104A indicating that the switch 11 is not turned on, it is determined at step 120 that the mechanical switch 11 has a failure. Then steps 100, 101, 102 and 104 are executed in the similar manner as in the first embodiment. Thus, the switching state is switched over by the switching part 10 from the state that the load 3 is connected to the power supply system 4 to the state that the load 3 is connected to the secondary battery 2a side. Then step 121 is executed.

When a check result is YES at step 104A indicating that the switch 11 is actually turned on, it is further checked at step 106A whether the semiconductor switch 13 is actually turned on. When a check result is NO at step 106A indicating that the semiconductor switch 13 is not turned on, it is determined at step 120 that the semiconductor switch 13 has a failure. Then steps 100, 101, 102, 103 and 121 are executed. Thus, the switching state is switched over by the switching part 10 from the state that the load 3 is connected to the power supply system 4 to the state that the load 3 is connected to the secondary battery 2a side.

(Switching Processing of FIG. 14)

The control part 60 executes the switching processing as shown in the flowchart of FIG. 14.

In FIG. 14, steps 100A and 102A of FIG. 9 are provided to be executed before steps 104, 105, 106 and 107 are executed.

When a check result is NO at step 100A indicating that the switch 12 is not turned on, step 120 is executed to determine that the mechanical switch 12 has a failure. Then steps 104, 105, 106 and 107 are executed in the similar manner as in the first embodiment. Thus, the switching state is switched over by the switching part 10 from the state that the load 3 is connected to the secondary battery 2a side to the state that the load 3 is connected to the power supply system 4. Then step 121 is executed.

When a check result is YES at step 100A indicating that the switch 12 is turned on, it is further checked at step 102A whether the semiconductor switch 14 is actually turned on. When a check result is NO at step 102A indicating that the semiconductor switch 14 is not turned on, it is determined at step 120 that the semiconductor switch 14 has a failure. Then steps 104, 105, 106, 107 and 121 are executed. Thus, the switching state is switched over by the switching part 10 from the state that the load 3 is connected to the secondary battery 2a side to the state that the load 3 is connected to the power supply system 4.

According to the sixth embodiment described above, the control part 60 can switch over the switching state from the state that the load 3 is connected to the power supply system 4 to the state that the load 3 is connected to the secondary battery 2a side when either one of the mechanical switch 11 and the semiconductor switch 13, which are provided between the load 3 and the power supply system 4, is failing under the state that the load 3 is connected to the power supply system 4. The control part 60 can switch over the switching state from the state that that the load 3 is connected to the secondary battery 2a side to the state that the load 3 is connected to the power supply system 4 when either one of the mechanical switch 12 and the semiconductor switch 14, which are provided between the load 3 and the secondary battery 2a side, is failing under the state that the load 3 is connected to the secondary battery 2a side.

Seventh Embodiment

The seventh embodiment is an example, in which the switches 11 to 14 are turned off when it is determined that any one of the switches 11 to 14 is failing at the time of switching of the switching state from the state that the load 3 is connected to one of the power supply system 4 and the secondary battery 2a side to the state that the load 3 is connected to the other of the power supply system 4 and the secondary battery 2a side.

Figure 15:
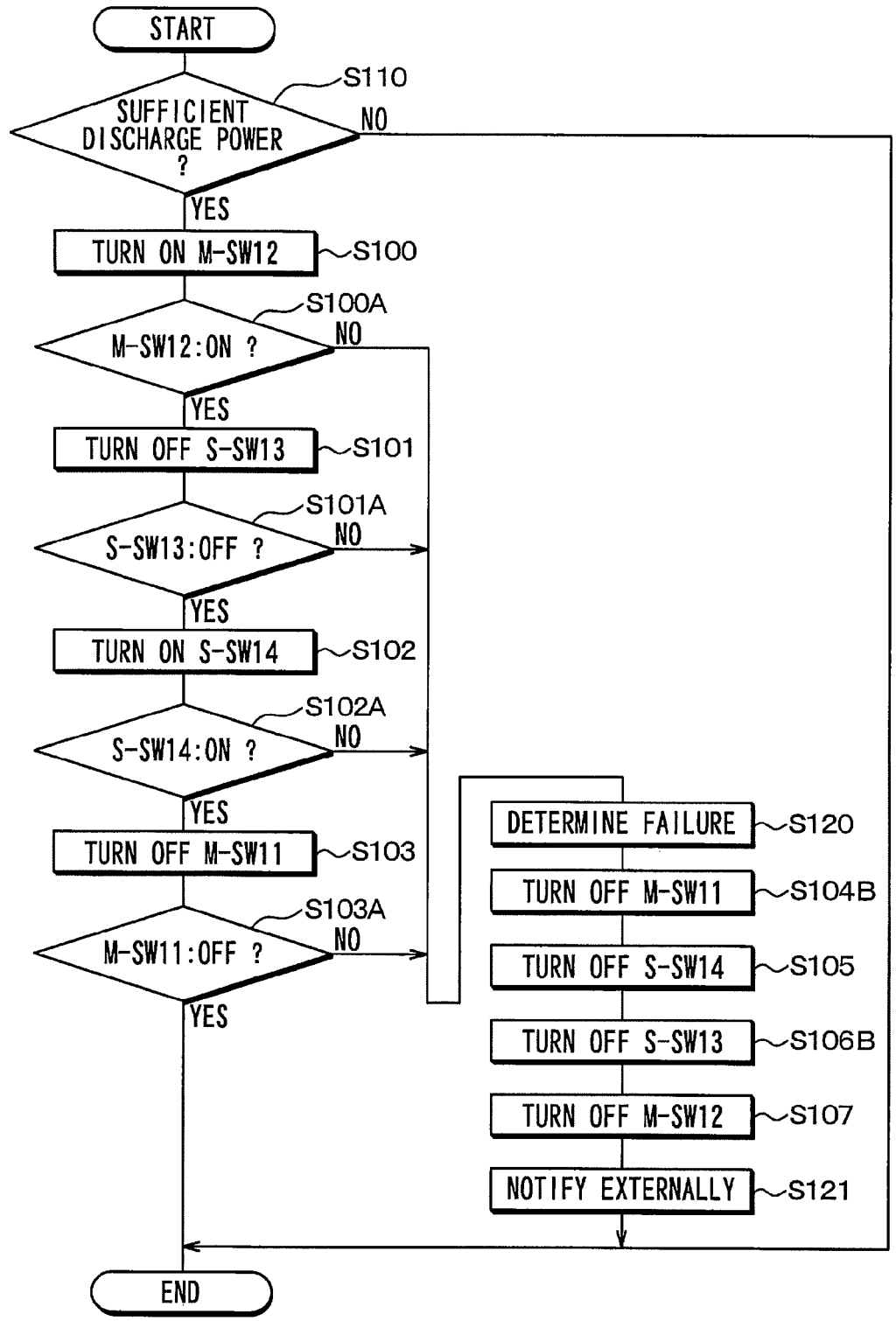
FIG. 15 is a flowchart showing switching processing executed by the control part according to a seventh embodiment.
Figure 16:
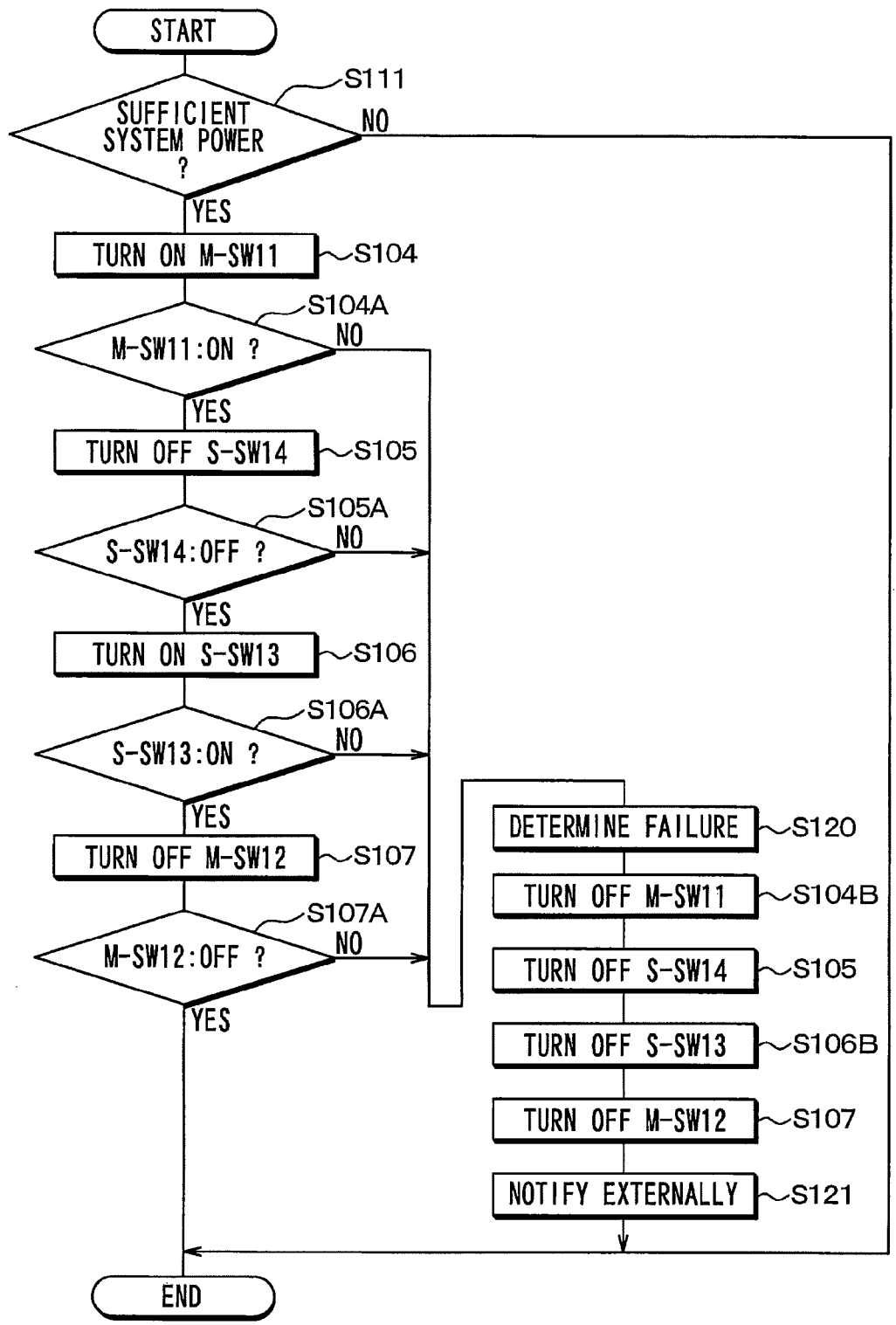
FIG. 16 is a flowchart showing switching processing executed by the control part according to the seventh embodiment.

The switching processing executed by the control part 60 in the seventh embodiment will be described with reference to FIG. 15 and FIG. 16. FIG. 15 is a flowchart showing switching processing for switching over a switching state from the state that the load 3 is connected to the power supply system 4 side to the state that the load 3 is connected to the secondary battery 2a side. FIG. 16 is a flowchart showing switching processing for switching over the switching state from the state that the load 3 is connected to the secondary battery 2a side to the state that the load 3 is connected to the power supply system 4 side. The switching processing of FIG. 15 and the switching processing of FIG. 16 are described below.

(Switching Processing of FIG. 15)

The control part 60 executes the switching processing as shown in the flowchart of FIG. 15.

In FIG. 15, steps 104B, 105, 106B and 107 are provided between steps 120 and 121 in FIG. 9. Step 104B is for turning off the mechanical switch 11. Step 105 is for turning off the semiconductor switch 14. Step 106B is for turning off the semiconductor switch 13. Step 107 is for turning off the mechanical switch 12.

In the seventh embodiment, when a check result is NO at any one of steps 100A, 101A, 102A and 103A, it is determined at step 120 that either one of the switches 11 to 14 has a failure. Then steps 104B, 105, 106B and 107 are executed. Thus each of the switches 11, 12, 13, 14 is turned off. Then step 121 is executed.

(Switching Processing of FIG. 16)

The control part 60 executes the switching processing as shown in the flowchart of FIG. 16.

In FIG. 16, steps 104B, 105, 106B and 107 are provided between steps 120 and 121 in FIG. 10. In the seventh embodiment, when a check result is NO at any one of steps 104A, 105A, 106A and 107A, it is determined at step 120 that either one of the switches 11 to 14 has a failure. Then steps 104B, 105, 106B and 107 are executed. Thus each of the switches 11, 12, 13 and 14 is turned off. Then step 121 is executed.

According to the seventh embodiment, the control part 60 can turn off the switches 11 to 14 when it is determined that at least one of the switches 11 to 14 is failing at the time of switching of the switching state from the state that the load 3 is connected to one of the power supply system 4 to the state that the load 3 is connected to the battery 2a side. The control part 60 can turn off all of the switches 11 to 14, when it is determined that any one of the switches 11 to 14 is failing at the time of switching of the switching state from the state that the load 3 is connected to the secondary battery 2a side to the state that the load 3 is connected to the power supply system 4.

Eighth Embodiment

An eighth embodiment is an example, in which the semiconductor switches 13 and 14 are turned on and off at zero-crossing time points when the system power and the discharge power become zero.

The switching processing executed by the control part 60 in the eighth embodiment will be described with reference to FIG. 17.

Figure 17:
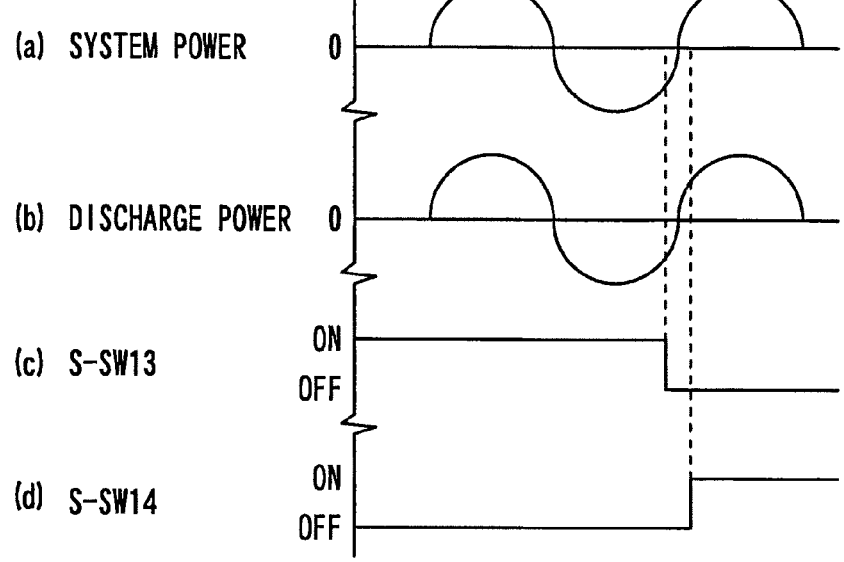
FIG. 17 is a flowchart showing switching processing executed by the control part according to an eighth embodiment.

FIG. 17 shows changes of the switching state from the state that the load 3 is connected to the power supply system 4 to the battery 2a side. In FIG. 17, (a), (b), (c) and (d) show the system power, the discharge power, the semiconductor switch 13 and the semiconductor switch 14.

The control part 60 turns off the semiconductor switch 13 at the time point of zero-crossing of the system power and instead turns on the semiconductor switch 14 at the time point of zero-crossing of the discharge power, when the switching state is switched over from the state that the load 3 is connected to the power supply system 4 to the state that the load is connected to the secondary battery 2a side.

The time point of zero-crossing of the system power is a time point, at which an absolute value of the system power is equal to or smaller than a predetermined value near zero. The time point of zero-crossing of the discharge power is a time point, at which an absolute value of the discharge power is equal to or smaller than a predetermined value near zero.

Although not shown, the control part 60 turns off the semiconductor switch 14 at the time point of zero-crossing of the discharge power and turns on the semiconductor switch 13 at the time point of zero-crossing of the system power, when the switching state is switched over from the state that the load 3 is connected to the secondary battery 2a side to the state that the load 3 is connected to the power supply system 4 side.

According to the eighth embodiment described above, the control part 60 turns on and off the semiconductor switches 13 and 14 at the time points of zero-crossing of the discharge power and the system power. Thus adversary influence on the load 3, the secondary battery 2a, the power supply system 4 and the like can be reduced.

Ninth Embodiment

A ninth embodiment is an example, in which the control part 60 controls the switches 11 to 14 to maintain an existing switching state that the load 3 is connected to one of the power supply system 4 and the DC-AC conversion device 2b, when it is determined that at least one of the switches 11 to 14 is failing in a case that the switches 11 to 14 are under control to connect the load 3 with either one of the power supply system 4 and the DC-AC conversion device 2b.

Figure 18:
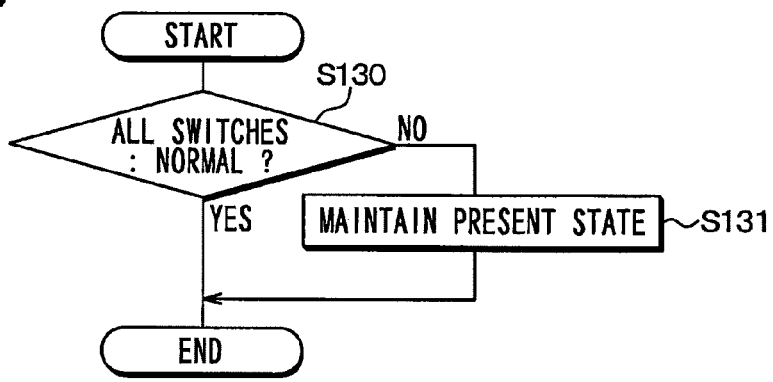
FIG. 18 is a flowchart showing switching processing executed by the control part according to a ninth, embodiment.
Figure 19:
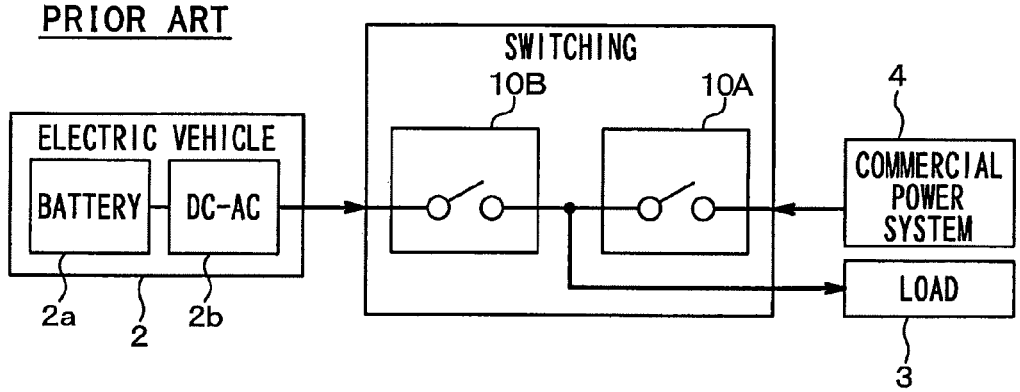
FIG. 19 is a block diagram showing a switching part according to a conventional apparatus.

The switching processing executed by the control part 60 in the present embodiment will be described with reference to FIG. 18. FIG. 18 is a flowchart showing switching processing executed by the control part 60.

It is checked first at step 130 whether all of the switches 11 to 14 are normal without any failure. In the following description, for simplicity, the mechanical switch 11 and the semiconductor switch 13 are referred to collectively as switches 11 and 13, respectively. Similarly, for simplicity, the mechanical switch 12 and the semiconductor switch 14 are referred to collectively as switches 12 and 14.

For example, when at least one of the switches 11 and 13 is not actually turned on under the state that the switches 11 to 14 are controlled to connect the power supply system 4 and the load 3, the switch, which is not actually turned on, is determined to be failing and a check result is determined to be NO at step 130.

When at least one of the switches 12 and 14 is not actually turned off under the state that the switches 11 to 14 are controlled to connect the power supply system 4 and the load 3, the switch, which is not actually turned off, is determined to be failing and a check result is determined to be NO at step 130.

When the check result is determined to be NO at step 130, the switches 11 to 14 are controlled to maintain the connection between the power supply system 4 and the load 3 at step 131.

When at least one of the switches 12 and 14 is not actually turned on under the state that the switches 11 to 14 are controlled to connect the DC-AC conversion device 2b and the load 3, the switch, which is not actually turned on, is determined to be failing and a check result is determined to be NO at step 130.

When at least one of the switches 11 and 13 is not actually turned off under the state that the switches 11 to 14 are controlled to connect the DC-AC conversion unit 2b and the load 3, the switch, which is not actually turned off, is determined to be failing and a check result is determined to be NO at step 130.

When the check result is determined to be NO at step 130, the switches 11 to 14 are controlled to maintain the connection between the DC-AC conversion unit 2b and the load 3.

When all of the switches 11 to 14 are normal without any failure, it is determined to be YES at step 130.

The switches 11 to 14 are checked individually in the similar manner as checked at steps 100A, 101A, 102A and 103A in FIG. 9 and steps 104A, 105A, 106A and 107A.

According to the ninth embodiment described above, the control part 60 can control the switches 11 to 14 to maintain the existing switching state that the load 3 is connected to one of the power supply system 4 and the DC-AC conversion device 2b, when it is determined that at least one of the switches 11 to 14 is failing in the case that the switches 11 to 14 are under control to connect the load 3 with either one of the power supply system 4 and the DC-AC conversion device 2b.

Other Embodiment

In the first to the ninth embodiments, the mechanical switch 11 is provided at the power supply system 4 side relative to the semiconductor switch 13. Alternatively, the semiconductor switch 13 may be provided at the power supply system 4 side relative to the mechanical switch 11.

In the first to the ninth embodiments, the mechanical switch 12 is provided at the DC-AC conversion device 12b side relative to the semiconductor switch 14. Alternatively, the semiconductor switch 14 may be provided at the DC-AC conversion unit 2b side relative to the mechanical switch 12.

In the first embodiment, the control part 60 is exemplified to execute both of the switching processing of FIG. 2 and FIG. 3. However, without being limited to this example, the control part 60 may execute only one of the switching processing of FIG. 2 and FIG. 3.

In the second embodiment, the control part 60 is exemplified to execute both of the switching processing of FIG. 5 and FIG. 6. However, without being limited to this example, the control part 60 may execute only one of the switching processing of FIG. 5 and FIG. 6.

In the third embodiment, the control part 60 is exemplified to execute both of the switching processing of FIG. 7 and FIG. 8. However, without being limited to this example, the control part 60 may execute only one of the switching processing of FIG. 7 and FIG. 8.

In the fourth embodiment, the control part 60 is exemplified to execute both of the switching processing of FIG. 9 and FIG. 10. However, without being limited to this example, the control part 60 may execute only one of the switching processing of FIG. 9 and FIG. 10.

In the fifth embodiment, the control part 60 is exemplified to execute both of the switching processing of FIG. 11 and FIG. 12. However, without being limited to this example, the control part 60, may execute only one of the switching processing of FIG. 11 and FIG. 12.

In the sixth embodiment, the control part 60 is exemplified to execute both of the switching processing of FIG. 13 and FIG. 14. However, without being limited to this example, the control part 60 may execute only one of the switching processing of FIG. 13 and FIG. 14.

In the seventh embodiment, the control part 60 is exemplified to execute both of the switching processing of FIG. 15 and FIG. 16. However, without being limited to this example, the control part 60 may execute only one of the switching processing of FIG. 15 and FIG. 16.

In the eighth embodiment, when the switching state is switched over from the state that the load 3 is connected to the power supply system 4 to the state that the load 3 is connected to the secondary battery 2a side, the semiconductor switches 13 and 14 are turned on and off at the time the system power and the discharge power cross zero, respectively. In addition, in the eighth embodiment, when the switching state is switched over from the state that the load 3 is connected to the secondary battery 2a side to the state that the load 3 is connected to the power supply system 4, the semiconductor switches 13 and 14 are turned on and off at the time the system power and the discharge power cross zero, respectively.

However, without being limited to this, in the eighth embodiment, the semiconductor switches 13 and 14 may be turned on and off at the time the system power and the discharge power cross zero, respectively, only when the switching state is switched over from the state that the load 3 is connected to the power supply system 4 to the state that the load 3 is connected to the secondary battery 2a side. Alternatively, the semiconductor switches 13 and 14 may be turned on and off at the time the system power and the discharge power cross zero, respectively, only when the switching state is switched over from the state that the load 3 is connected to the secondary battery 2a side to the state that the load 3 is connected to the power supply system 4.

In the fourth embodiment, the display part 50 displays the failure of the switches 11 to 14 to notify externally that the switches 11 to 14 is failing. However, the failure of the switches 11 to 14 may be transmitted to a communication terminal to notify externally that the switches 11 to 14 is failing.

In the eighth embodiment, the semiconductor switches 13 and 14 are turned on and off exemplarily at the zero-crossing time points in the first embodiment. Alternatively, the semiconductor switches 13 and 14 may be turned on and off at the zero-crossing time points in the second to the seventh embodiments.

In the first to the ninth embodiments, the secondary battery 2a is exemplified as being mounted on the electric vehicle. Alternatively, the secondary battery 2a may be fixedly located on the ground.

In the eighth embodiment, the semiconductor switches 13 and 14 are exemplified as being turned on and off at the zero-crossing time points. Alternatively, in the first, to the seventh embodiments, the semiconductor switches 13 and 14 may be turned on and off at the zero-crossing time points.

In the ninth embodiment, the control' part 60 is exemplified to execute the following two processing. Alternatively the control part 60 may execute either one of the two processing.

The control part 60 may control the switches 11 to 14 to maintain the connection between the power supply system 4 and the load 3, when at least one of the switches 11 to 14 is determined to be failing at the time of controlling the switches 11 to 14 to connect the power supply system 4 and the load 3. The control part 60 may control the switches 11 to 14 to maintain the connection between the DC-AC conversion unit 2b and the load 3, when at least one of the switches 11 to 14 is determined to be failing at the time of controlling the switches 1 to 14 to connect the battery 2b and the load 3.

The first to the ninth embodiments are exemplified to use the two-phase AC power supplied from the power supply system 4 and the DC-AC conversion unit 2b. Alternatively, three-phase AC power may be supplied from the power supply system 4 and the DC-AC conversion device 2b.

The AC power supply source switching apparatus is not limited to the disclosed embodiments but may be varied. The embodiments described above are not irrelevant one another but may be combined unless such a combination is impossible. For example, the fifth embodiment and the sixth embodiment may be combined. The sixth embodiment and the seventh embodiment may be combined.

In the above-described embodiments, the control part 60 is a programmed computer, which executes various processing steps. The control part 60 may be configured as an electronic hardware circuit, which includes the following circuit parts for performing the processing steps as follows. First, second, third, fourth, fifth, sixth, seventh and eighth parts correspond to steps 100 to 107, respectively. Further a failure check part corresponds to steps 100A, 101A, 102A, 103A, 104A, 105A, 106A and 107A, and a notifying part corresponds to step 121.

What is claimed is:

1. An AC power supply source switching apparatus comprising:
   a first mechanical switch connected between a load and a power supply system, which supplies AC power as system power;
   a first semiconductor switch connected in series to the first mechanical switch between the load and the power supply system;
   a second mechanical switch connected between the load and a DC-AC conversion device, which converts DC power of a secondary battery to AC power;
   a second semiconductor switch connected in series to the second mechanical switch between the load and the DC-AC conversion device; and
   a switching control part for controlling the first and the second mechanical switches and the first and the second semiconductor switches to switch over a switching state from a first state to a second state, the first state being that the load is connected to the power supply system through the first mechanical switch and the first semiconductor switch and disconnected from the secondary battery, and the second state being a state that the load is connected to the secondary battery through the second mechanical switch and the second semiconductor switch and is disconnected from the power supply system.

2. The AC power supply source switching apparatus according to claim 1, wherein the switching control part includes:
   a first switch control part for turning on the second mechanical switch;
   a second switch control part for turning off the first semiconductor switch after an operation of the first switch control part;
   a third switch control part for turning on the second semiconductor switch after an operation of the second switch control part; and
   a fourth switch control part for turning off the first mechanical switch after an operation of the third switch control part, thereby the switching state is switched over from the first state to the second state.

3. The AC power supply source switching apparatus according to claim 1, wherein the switching control part includes:
a fifth switch control part for turning on the first mechanical switch;
a sixth switch control part for turning off the second semiconductor switch after an operation of the fifth switch control part;
a seventh switch control part for turning on the first semiconductor switch after an operation of the sixth switch control part; and
an eighth switch control part for turning off the second mechanical switch after an operation of the seventh switch control part,
thereby the switching state is switched over from the second state to the first state.

4. The AC power supply source switching apparatus according to claim 1, further comprising at least one of:
a discharge detection part for monitoring discharge power, which is discharged from the DC-AC conversion device; and
a system power detection part for monitoring system power, which is supplied from the power supply system.

5. The AC power supply source switching apparatus according to claim 4, wherein:
the switching control part controls the first and the second mechanical switches and the first and the second semiconductor switches to switch over the switching state from the first state to the second state, when a detection signal of the discharge detection part indicates that the discharge power of the DC-AC conversion device is larger than a discharge power threshold value.

6. The AC power supply source switching apparatus according to claim 4, wherein:
the switching control part controls the first and the second mechanical switches and the first and the second semiconductor switches to switch over the switching state from the second state to the first state, when a detection signal of the system power detection part indicates that the system power of the power supply system is larger than a system power threshold value.

7. The AC power supply source switching apparatus according to claim 4, wherein:
the switching control part controls the first and the second mechanical switches and the first and the second semiconductor switches to switch over the switching state from the first state to the second state, when the detection signal of the system power detection part indicates that the system power of the power supply system is lower than the system power threshold value.

8. The AC power supply source switching apparatus according to claim 4, wherein:
the switching control part controls the first and the second mechanical switches and the first and the second semiconductor switches to switch over the switching state from the second state to the first state, when a detection signal of the discharge detection part indicates that the discharge power of the DC-AC conversion device is lower than the discharge power threshold value.

9. The AC power supply source switching apparatus according to claim 1, further comprising:
a failure check part for checking individually whether each of the first and the second mechanical switches and the first and the second semiconductor switches is failing.

10. The AC power supply source switching apparatus according to claim 9, further comprising:
a notifying part for notifying externally that a switch failure is present, when the failure check part determines that either one of the first and the second mechanical switches and the first and the second semiconductor switches is failing.

11. The AC power supply source switching apparatus according to claim 9, wherein:
the switching control part controls the first and the second mechanical switches and the first and the second semiconductor switches to return the switching state to the first state, when the failure check part determines that at least one of the first and the second mechanical switches and the first and the second semiconductor switches is failing at the time of switching from the first state to the second state.

12. The AC power supply source switching apparatus according to claim 9, wherein:
the switching control part controls the first and the second mechanical switches and the first and the second semiconductor switches to return the switching state to the second state, when the failure check part determines that at least one of the first and the second mechanical switches and the first and the second semiconductor switches is failing at the time of switching from the second state to the first state.

13. The AC power supply source switching apparatus according to claim 9, wherein:
the switching control part controls the first and the second mechanical switches and the first and the second semiconductor switches to switch over the switching state from the first state to the second state, when the failure check part determines that either one of the first mechanical switch and the first semiconductor switches is failing.

14. The AC power supply source switching apparatus according to claim 9, wherein:
the switching control part controls the first and the second mechanical switches and the first and the second semiconductor switches to switch over the switching state from the second state to the first state, when the failure check part determines that either one of the second mechanical switch and the second semiconductor switches is failing.

15. The AC power supply source switching apparatus according to claim 9, wherein:
the switching control part turns off the first and the second mechanical switches and the first and the second semiconductor switches, when the failure check part determines that at least one of the first and the second mechanical switches and the first and the second semiconductor switches is failing.

16. The AC power supply source switching apparatus according to claim 9, wherein:
the switching control part controls the first and the second mechanical switches and the first and the second semiconductor switches to maintain a state that the load is connected to the one of the power supply system and the secondary battery, when the failure check part determines that at least one of the first and the second mechanical switches and the first and the second semiconductor switches is failing at the time the first and the second mechanical switches and the first and the second semiconductor switches are controlled to maintain a state that the load is connected to the one of the power supply system and the secondary battery.

17. The AC power supply source switching apparatus according to claim 1, wherein:
the switching control part controls the first and the second semiconductor switches to turn on and off at time points of zero-crossing of the system power supplied from the power supply system and the discharge power supplied from the DC-AC conversion device.

18. The AC power supply source switching apparatus according to claim 2, wherein the switching control part includes:
a fifth switch control part for turning on the first mechanical switch;
a sixth switch control part for turning off the second semiconductor switch after an operation of the fifth switch control part;
a seventh switch control part for turning on the first semiconductor switch after an operation of the sixth switch control part; and
an eighth switch control part for turning off the second mechanical switch after an operation of the seventh switch control part,
thereby the switching state is switched over from the second state to the first state.

19. The AC power supply source switching apparatus according to claim 18, further comprising:
a discharge detection part for monitoring discharge power, which is discharged from the DC-AC conversion device; and
a system power detection part for monitoring system power, which is supplied from the power supply system,
wherein the switching control part allows a switchover from the first state to the second state only when a detection signal of the discharge detection part indicates that the discharge power of the DC-AC conversion device is larger than a discharge power threshold value, and a switchover from the second state to the first state only when a detection signal of the system power detection part indicates that the system power of the DC-AC conversion device is larger than a system power threshold value, and
wherein the switching control part performs a switchover from the first state to the second state, when the detection signal of the system power detection part indicates that the system power of the power supply system is lower than the system power threshold value, and a switchover from the second state to the first state when the detection signal of the discharge detection part indicates that the discharge power of the DC-AC conversion device is lower than the discharge power threshold value.

20. The AC power supply source switching apparatus according to claim 18, further comprising:
a failure check part for checking individually whether each of the first and the second mechanical switches and the first and the second semiconductor switches is failing; and
a notifying part for notifying externally that a switch failure is present, when the failure check part determines that either one of the first and the second mechanical switches and the first and the second semiconductor switches is failing.

21. The AC power supply source switching apparatus according to claim 20, wherein:
the switching control part controls the first and the second mechanical switches and the first and the second semiconductor switches to return the switching state to the first state, when the failure check part determines that at least one of the first and the second mechanical switches and the first and the second semiconductor switches is failing at the time of switching from the first state to the second state; and
the switching control part controls the first and the second mechanical switches and the first and the second semiconductor switches to return the switching state to the second state, when the failure check part determines that at least one of the first and the second mechanical switches and the first and the second semiconductor switches is failing at the time of switching from the second state to the first state.

22. The AC power supply source switching apparatus according to claim 20, wherein:
the switching control part controls the first and the second mechanical switches and the first and the second semiconductor switches to switch over the switching state from the first state to the second state, when the failure check part determines that either one of the first mechanical switch and the first semiconductor switch is failing; and
the switching control part controls the first and the second mechanical switches and the first and the second semiconductor switches to switch over the switching state from the second state to the first state, when the failure check part determines that either one of the second mechanical switch and the second semiconductor switch is failing.

23. The AC power supply source switching apparatus according to claim 20, wherein:
the switching control part turns off the first and the second mechanical switches and the first and the second semiconductor switches, when the failure check part determines that at least one of the first and the second mechanical switches and the first and the second semiconductor switches is failing.

24. The AC power supply source switching apparatus according to claim 20, wherein:
the switching control part controls the first and the second mechanical switches and the first and the second semiconductor switches to maintain a state that the load is connected to the one of the power supply system and the secondary battery, when the failure check part determines that at least one of the first and the second mechanical switches and the first and the second semiconductor switches is failing at the time the first and the second mechanical switches and the first and the second semiconductor switches are controlled to maintain a state that the load is connected to the one of the power supply system and the secondary battery.

25. The AC power supply source switching apparatus according to claim 20, wherein:
the switching control part controls the first and the second semiconductor switches to turn on and off at time points of zero-crossing of the system power supplied from the power supply system and the discharge power supplied from the DC-AC conversion device.

* * * * *